United States Patent [19]

Berger et al.

[11] 4,265,225

[45] May 5, 1981

[54] SOLAR COLLECTOR ELEMENT

[75] Inventors: Ernst Berger, Altdorf; Norbert Herwegh, Schattdorf, both of Switzerland

[73] Assignee: Datwyler AG.Schweiz, Kabel-, Gummi- und Kunststoffwerke, Altdorf, Switzerland

[21] Appl. No.: 967,026

[22] Filed: Dec. 6, 1978

[30] Foreign Application Priority Data

Dec. 9, 1977 [CH] Switzerland .................. 15160/77

[51] Int. Cl.³ .............................. F24J 3/02; F28F 9/02
[52] U.S. Cl. ................................... 126/445; 126/448; 165/173; 165/175
[58] Field of Search ............... 126/442, 445, 444, 448, 126/450; 165/173, 175

[56] References Cited

U.S. PATENT DOCUMENTS

| | | | |
|---|---|---|---|
| T952,004 | 11/1976 | Brackman | 126/442 |
| 3,670,812 | 6/1972 | Bemrose | 165/175 |
| 3,689,972 | 9/1972 | Mosier | 165/175 |
| 4,024,853 | 5/1977 | Gordon | 165/173 |
| 4,062,351 | 12/1977 | Hastwell | 126/444 |
| 4,098,262 | 7/1978 | Peters | 126/444 |
| 4,098,331 | 7/1978 | Ford | 126/448 |
| 4,114,597 | 9/1978 | Erb | 126/448 |
| 4,120,286 | 10/1978 | Farber | 126/444 |
| 4,127,102 | 11/1978 | Berman | 126/444 |
| 4,146,011 | 3/1979 | Thomason et al. | 126/444 |

*Primary Examiner*—James C. Yeung
*Assistant Examiner*—Daniel O'Connor
*Attorney, Agent, or Firm*—Weingarten, Maxham & Schurgin

[57] ABSTRACT

Two identical header tube members are fitted to opposite ends of an absorbing member with a plurality of internal channels for circulation of a heat transport fluid to form a collector element. Each header has a header tube which is spaced from a header base plate by a tube saddle. The perimeter of the element includes a flange for joining it together with other, identical elements. Any number of such elements may be joined together to form a continuous, watertight sheet. Where the header tubes of adjoining elements connect, their spacing from the base plate leaves a passageway under them between adjacent tube saddles. Water can run off the surface through the passageway in the direction of slope of the surface upon which the sheet of elements is installed.

5 Claims, 3 Drawing Figures

SOLAR COLLECTOR ELEMENT

BACKGROUND OF THE INVENTION

The present invention concerns an element which, for simplicity, is commonly known as a solar collector. Many such collectors have already become known. They have a structure which from the standpoint of heat absorption, as well as from the standpoint of low production cost, has attained a notably high standard. In this, however, little consideration has been given to the likewise important problem of the low-cost mounting of such collectors on roofs, the operation of such an installation with respect to the influence of weather, and above all, the problem of the low-cost joining of individual such collectors into larger installations suitably adapted as desired to the given dimensions of the roof.

These problems, however, must also be taken into consideration if the installation is to serve its purpose. In most cases, the individual parts of the element are assembled in a frame and then mounted in the form of a closed case. However, there are also embodiments which consist only of individual hoses or tubes, or individual courses or plates. The difficulty aside from that of the connecting together of the individual absorbing layers with their transport fluids, is in tightly joining the individual elements or cases, insofar as a plurality are to be arranged next to each other. Otherwise, there arises a visual impression of individual cases or individual rasters which do not always permit integration with the existing roof surfaces. One attempt at avoiding these difficulties has already become known (DE-Bbm No. 7714688). The roof covering shown there is constructed of structural synthetic members for the transport of the heat transfer medium which permit themselves to be pushed together like boards provided with tongue and groove. Not solved, however, is the problem of how the header tubes, which must connect together the individual lengthwise-running profile chambers for the heat transfer medium, are to be attached so that rain or thaw water can run off.

It is an object of the present invention to provide an element so constructed that it is possible with it to connect any desired number of elements on all sides to form a closed, and above all also a sealed sheet. This sheet can then be suitably connected to the existing roof covering to form with it a closed unit which can be used as a vapor barrier for moisture rising from below and/or as a rain cover for water coming from above. Special attention is to be given to the fast runoff of rain or thaw water from the total surface, so that the later solar energy absorbing is not impaired. Thereby, all of the elements should in any case be able to form a complete solar collector installation, without regard to whether few or very many elements are used together.

SUMMARY OF THE INVENTION

In accordance with the present invention there is provided a solar collector element which is an assembly of an absorbing layer member and two header members. The collector element is so designed that a plurality of such elements can be joined to form a continuous, sealed covering with water run-off in one direction. The two header members are identical. The run-off is provided by a channel formed by the header members of two joined elements.

DESCRIPTION OF THE PREFERRED EMBODIMENTS

Figure 1:
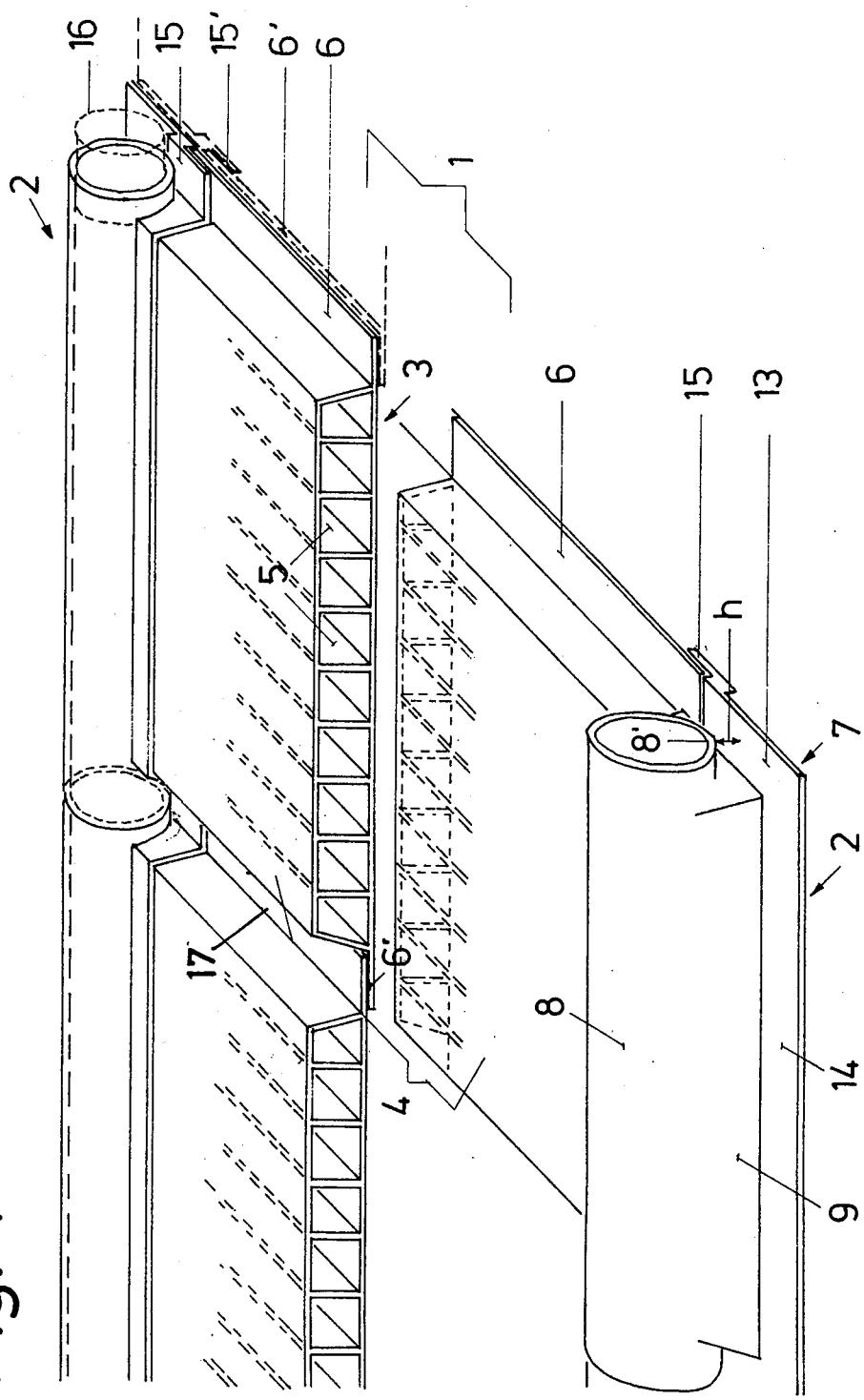
FIG. 1 is an elevated partially sectioned perspective view of a solar collector element in accordance with a preferred embodiment of the present invention joined to a fragment of a second, identical such element on one side and with phantom lines showing on the other side the relationship of the side connecting portions of a third identical element which would be joined to it on the other side.

FIG. 1 shows a section of a solar collector installation which consists essentially only of absorbing layer members and header members but which, nevertheless, may still be supplemented by insulation and a cover. One element is complete, but sectioned in the middle to show the channels in the inside, while there is shown only a fragment of a second adjoining element.

The element consists of an absorbing layer member 1 and two completely identical header members 2. The three parts are fabricated separately, and then afterwards joined together, primarily because thereby the absorbing layer member can be made of synthetic and extruded in almost any desired length. Such an extruded strip is then cut into pieces of the needed length, to which then the header members are assembled.

As may be seen, the absorbing layer member 1 has essentially a base plate 3, on which there is supported the actual absorbing layer 4 consisting of inner channels 5 running parallel adjacent each other. In the shown embodiment, the inner channels 5 have a square cross-section, with the exception of the channels lying at the edges. Through these channels 5 there circulates the heat transport medium to be heated, normally a liquid. The channels 5 take up together a width which is less than the width of the base plate 3. There are formed thereby two side flanges 6, 6'.

As can be seen from the lower half of FIG. 1, the header member 2 also has a base plate 7, the width of which is the same as that of the base plate 3. Resting somewhat raised on it is a tube 8, having a length equal to the width of the base plate 3 or 7. The tube 8 is a single piece provided with a tube saddle 9, which in accordance with FIG. 1 lies on the base plate 3, and in accordance with FIG. 2 becomes on one side a wide flange 10. The height of the tube saddle 9 is chosen so that the lowest point 8' of the tube is at a spacing h over the base plate. The purpose of this will be described in more detail later. The tube saddle 9 has an opening 11 under the flange 10 and along its entire width; by this there is formed a wide channel 12 (FIG. 3), which extends to within the cross-section of the tube 8.

Figure 2:
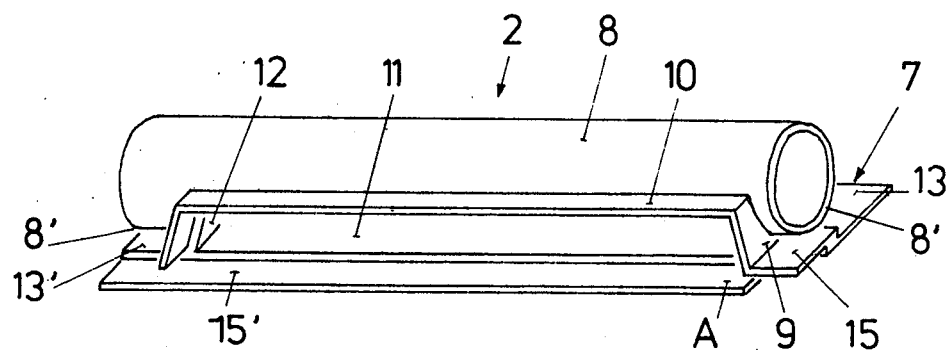
FIG. 2 is a frontal elevated perspective view of one of the header members of the collector of FIG. 1, separate from the other parts.
Figure 3:
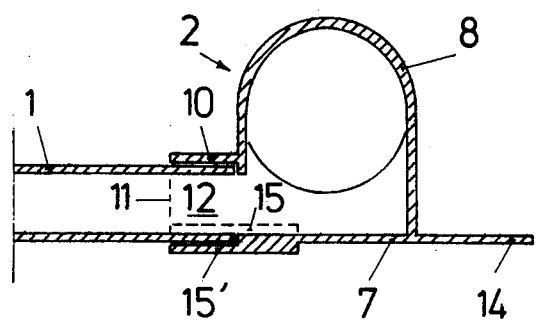
FIG. 3 is a partially schematic side sectional view of a fragment of the collector element of FIG. 1 where the members are joined.

It can be seen from the FIGS. 1 and 2 that the tube saddle 9 has the same width as the absorbing layer 4 of the part 1, so that the base plate 7 analog of the base plate 3 projects on both sides and forms side flanges 13, 13'. A side flange 14 is additionally formed by the base plate 7 (FIG. 1) on the back.

On the wide side which is under the flange 10, the base plate 7 is provided with two projections 15, 15' which are both displaced with respect to the plane of the base plate 7. The projection 15, which is only as wide as the flange 13, is displaced upwards toward the tube 8, while the projection 15' is displaced downward and extends along the entire width of the header piece 2, except for the width of the projection 15. The spacing of the two projections 15, 15' at the location A (FIG. 2) is essentially equal to the thickness of the base plate 7. It should be noted that the projection 15, which is displaced upwards, also is spaced from the tube 8.

As may be seen from the FIG. 1, each absorbing layer member 1 is joined with two header members 2 to form an element. In this there arise two possible constructions for the joining, namely: either butt-joining with adhesive or welding; or, lapp-joining with adhesive, welding, or vulcanization. Only the latter variant is shown in the figures. As may be seen from the FIG. 2, the projections 15, 15' reach under or over the flanges 6, 6' of the member 1, so that the two base plates 3, 7 are at the same level. At the same time, the flange 10 of each header member 2 covers the openings of the channels 5 of the chamber 1 bordering on them, so that there is formed a completely sealed connection from the tube 8 of the one header member 2 to the channels 5, and from these to the tube 8 of the other header member. Thus, the heat transport medium can be supplied to the feeding header member 1 on the one side, whereupon after it is warmed in this member 1 it is again led off through the other collecting header member.

As may be seen from the FIG. 1, not only is each element fabricated by overlapping of the members, but the elements are also aligned side-by-side by overlapping, through which a flange 6' of the one element ends up lying under the flange 6 of the other element. One now recognizes also the necessity of the different displacements 15, 15' of the header members from the plane of their base plates 7; as may be seen from the upper right of FIG. 1, it would otherwise not be possible to have an overlapping at the connecting point of the parts 1 and 2. As a result of the mentioned different displacement, the projection 15 of the one element ends up lying on the upper side and the projection 15' of the other element on the lower side of the two overlapping flanges 6, 6'.

Because each tube 8 extends the full width of the header member, or of the entire element, the ends of adjacent tubes abut each other. A sealed connection can be made by means of short tube inserts 16 and with tightening bands around the ends of the tubes. Also conceivable would be a cuff-like design for the abutting tubes. The choice of the connection depends primarily upon what material is used for the elements.

As can be further seen from FIG. 1, there is formed a large absorbing sheet by the assembling of a plurality of elements which are rich in channels 17 and are bounded on both sides by the tubes. By this there arises a trough, or channel configuration which for assemblies on flat roofs would hold back the water at least in the mentioned channels 17, if no provisions were made for permitting the water fo flow off elsewhere than only at the edges. Such run-off is made possible by the mentioned spaced arrangement of the header tubes above the base plates, so that where tubes abut, there are also formed tunnel-like passages for the channels 17 through which the water can flow off everywhere, for assembly on slanting roofs.

With the herein described embodiment of the elements, surfaces of any desired length and width may be fabricated. Thereby on the one hand optimum use can be made of the existing roof surfaces and, on the other hand, aesthetic aspects can be considered to a great extent, which, for exampie, can in some cases play an important role in the adaptation of such elements to roofs of older houses.

We claim:

1. In a solar energy collector element of the type comprising an absorbing layer member having a plurality of internal channels for circulating a heat transport medium and a header member fastened at each open end of the absorbing layer member to supply the transport medium to the internal channels and collect it, an improved header member which permits at least two solar elements to be assembled together as a composite unit, said header member comprising:
   a base plate;
   a plurality of projections attached to one side of said base plate, each said projection being oppositely displaced in relation to the other with respect to the plane of said base plate, each said base plate and projections acting together with the base plate and projections of an adjacent header member to join any number of solar elements as a continuous watertight sheet;
   a tube saddle fixed to said base plate; and
   a header tube fixed upon and opening into the interior of said tube saddle, said header tube resting on said saddle at a predetermined height spaced above the plane of said base plate and forming with said saddle a longitudinal channel opening which extends substantially for the length of said header tube.

2. The element of claim 1, and wherein said tube is substantially the same length as said header base plate.

3. The element of claim 2 and wherein said header member and said absorbing layer member comprise flanges projecting at their perimeter for joining together a plurality of said elements.

4. The element of claim 3 and wherein said flanges joined with other such element is displaced upward to permit the adjoining flange to lap under it and thereby lie flush at the bottom surface of said element.

5. The element of claim 4 and comprising projections extending outwards from said header member about said channel opening for telescopingly receiving a matching end of said absorbing layer member.

* * * * *

UNITED STATES PATENT AND TRADEMARK OFFICE
CERTIFICATE OF CORRECTION

PATENT NO. : 4,265,225
DATED : May 5, 1981
INVENTOR(S) : Ernst Berger, et al

It is certified that error appears in the above—identified patent and that said Letters Patent is hereby corrected as shown below:

Column 3, line 22, "chamber 1" should read --member 1--.

Column 4, line 2, "fo" should read --to--.

Column 4, line 51, "joined with" should read --when joined with--.

Signed and Sealed this

Tenth Day of November 1981

[SEAL]

Attest:

GERALD J. MOSSINGHOFF

Attesting Officer

Commissioner of Patents and Trademarks